United States Patent
Murofushi (10) Patent No.: US 11,361,171 B2
(45) Date of Patent: Jun. 14, 2022

(54) WIRELESS TAG READING APPARATUS AND CONTROL METHOD FOR A WIRELESS TAG READING APPARATUS

(71) Applicant: TOSHIBA TEC KABUSHIKI KAISHA, Tokyo (JP)

(72) Inventor: Nobuo Murofushi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/070,833

(22) Filed: Oct. 14, 2020

(65) Prior Publication Data

US 2021/0224494 A1 Jul. 22, 2021

(30) Foreign Application Priority Data

Jan. 16, 2020 (JP) .............................. JP2020-004843

(51) Int. Cl.
*G06K 7/10* (2006.01)
(52) U.S. Cl.
CPC ..... *G06K 7/10158* (2013.01); *G06K 7/10297* (2013.01)
(58) Field of Classification Search
CPC ........................ G06K 7/10158; G06K 7/10297
See application file for complete search history.

(56) References Cited

U.S. PATENT DOCUMENTS

2011/0193687 A1 8/2011 Hirata

OTHER PUBLICATIONS

C. Chen, Y. Chen, T. Li, Y. Yu and W. Wu, "A chipless RFID system based on polarization characteristics," 2017 7th IEEE International Symposium on Microwave, Antenna, Propagation, and EMC Technologies (MAPE), 2017, pp. 324-329, doi: 10.1109/MAPE.2017.8250866. (Year: 2017).*

* cited by examiner

*Primary Examiner* — Matthew Mikels
(74) *Attorney, Agent, or Firm* — Kim & Stewart LLP (57) ABSTRACT

In accordance with an embodiment, a wireless tag reading apparatus includes an antenna, first and second power feeding ports, and a controller. The first power feeding port feeds electric power into the antenna so as to emit the first linearly polarized wave from the antenna. The second power feeding port feeds electric power into the antenna so as to emit the second linearly polarized wave from the antenna. The controller sets a ratio of a time of power feeding from the first power feeding port to a time of power feeding from the second power feeding port to take a value according to a ratio of the number of wireless tags existing in the direction of the first linearly polarized wave to the number of wireless tags existing in the direction of the second linearly polarized wave.

5 Claims, 9 Drawing Sheets

WIRELESS TAG READING APPARATUS AND CONTROL METHOD FOR A WIRELESS TAG READING APPARATUS

CROSS-REFERENCE TO RELATED APPLICATION

This application is based upon and claims the benefit of priority from the prior Japanese Patent Application No. 2020-004843, filed on Jan. 16, 2020, the entire contents of which are incorporated herein by reference.

FIELD

An embodiment described here generally relates to a wireless tag reading apparatus and a control method for a wireless tag reading apparatus.

BACKGROUND

In recent years, stock management, sales management, and the like of articles have been performed by reading information of wireless tags such as RFID tags attached to the articles. In general, since directions of provided wireless tags are unknown when reading the wireless tags, information of the wireless tags is read by emitting a circularly polarized wave capable of reading irrespective of the directions of the wireless tags.

However, the communicable distance of the circularly polarized wave is short. Therefore, if there is a need for securing a long communication distance, a linearly polarized wave having a longer communicable distance at the same radio wave intensity are used. For example, the wireless tags are read by switching between linearly polarized waves different in direction of polarization and using them.

However, if the directions of the provided wireless tags are unknown, it is also unknown how much time it should take to emit respective linearly polarized wave for reading all the wireless tags. Therefore, in a traditional method of switching between linearly polarized waves, it is necessary to emit a radio wave for an unnecessarily long time. Accordingly, there is a problem of low efficiency due to the long reading time.

DETAILED DESCRIPTION

In accordance with one embodiment, a wireless tag reading apparatus performs wireless communication with a wireless tag that stores information. The wireless tag reading apparatus includes an antenna, first and second power feeding ports, and a controller. The antenna is capable of emitting a first linearly polarized wave having a first plane of polarization and a second linearly polarized wave having the second plane of polarization different in direction from the first plane of polarization. The first power feeding port feeds electric power into the antenna so as to emit the first linearly polarized wave from the antenna. The second power feeding port feeds electric power into the antenna so as to emit the second linearly polarized wave from the antenna. The controller sets a ratio of a time of power feeding from the first power feeding port into the antenna to a time of power feeding from the second power feeding port into the antenna to take a value according to a ratio of the number of wireless tags existing in the direction of the first linearly polarized wave to the number of wireless tags existing in the direction of the second linearly polarized wave. The controller switches between the power feeding into the antenna from the first power feeding port and the power feeding into the antenna from the second power feeding port in accordance with the set ratio of the power feeding times. The controller receives a response wave of the first linearly polarized wave or the second linearly polarized wave via the antenna to thereby read the information of the wireless tag included in the response wave.

First Embodiment

Hereinafter, a wireless tag reading apparatus 10*a* that is a first embodiment and a control method for the wireless tag reading apparatus 10*a* will be described with reference to the drawings. In the drawings, identical symbols denote identical or similar parts.

(Description of Overall Configuration of Wireless Tag Reading Apparatus)

Figure 1:
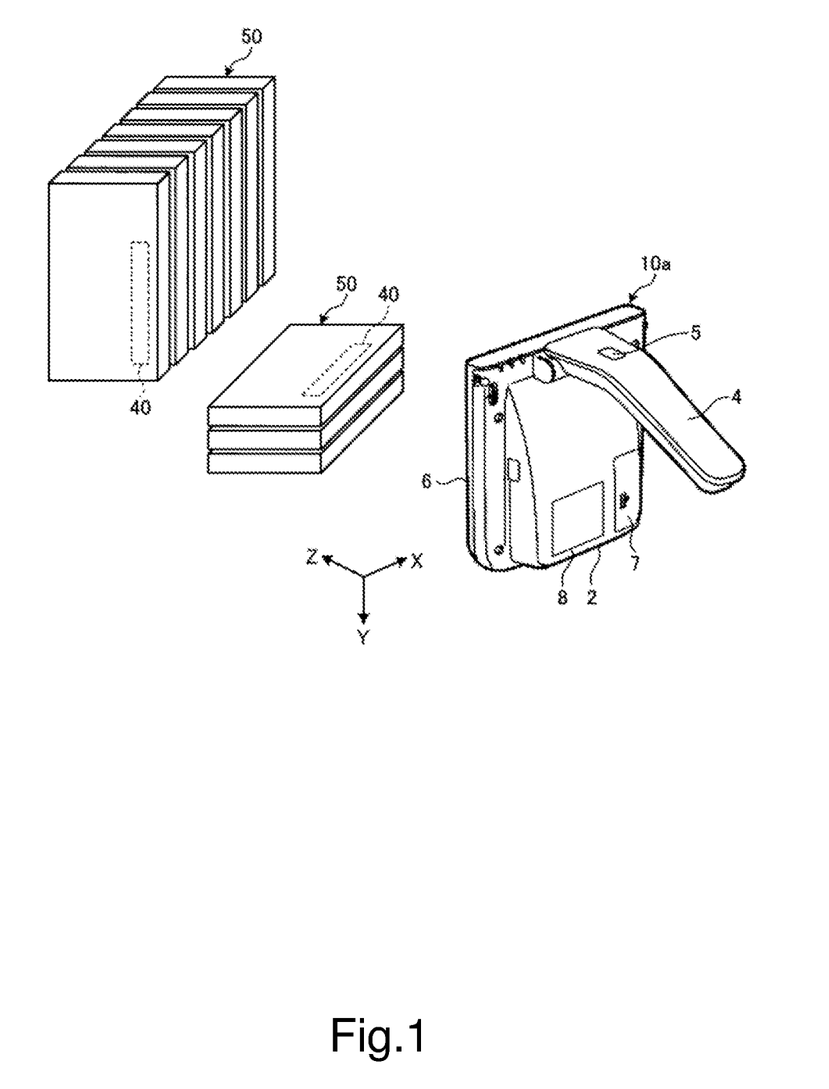
FIG. 1 is an outer appearance perspective view showing an example of a wireless tag reading apparatus according to a first embodiment.

Referring to FIG. 1, an overall configuration of the wireless tag reading apparatus will be described. FIG. 1 is an outer appearance perspective view showing an example of the wireless tag reading apparatus according to the first embodiment. The wireless tag reading apparatus 10*a* is an RFID reader, for example.

The wireless tag reading apparatus 10*a* includes a main body portion 2, a grip portion 4, a trigger switch 5, and a liquid-crystal display 8. The liquid-crystal display 8 includes an operation unit such as a touch panel, for example. The main body portion 2 includes an RFID antenna 6 and a battery 7. The main body portion 2 performs wireless communication with radio frequency identification (RFID) tags 40 that are examples of wireless tags attached to articles. The RFID antenna 6 transmits and receives a radio wave for performing wireless communication with the RFID tags 40. It should be noted that the wireless communication with the RFID tags 40 will be described later in detail.

The grip portion 4 is a portion that an operator grips during operation. The grip portion 4 is disposed on a rear side of the main body portion 2. The grip portion 4 is provided with the trigger switch 5. When the operator turns on the trigger switch 5 while gripping the grip portion 4, the wireless tag reading apparatus 10a emits a radio wave from the RFID antenna 6. Then, when the operator turns off the trigger switch 5, the wireless tag reading apparatus 10a stops emission of a radio wave from the RFID antenna 6. The liquid-crystal display 8 displays an operation state of the wireless tag reading apparatus 10a, tag information of the RFID tag 40 read by the wireless tag reading apparatus 10a, and the like. It should be noted that the tag information is information stored in the RFID tag 40 as will be described later.

The RFID tag 40 receives a radio wave emitted from the RFID antenna 6 and transmits, as the response, an electronic product code (EPC) that is an identifier that uniquely identifies an article 50 attached to the RFID tag 40 to the wireless tag reading apparatus 10a. The wireless tag reading apparatus 10a completes reading of the RFID tag 40b by receiving the EPC. It should be noted that the EPC is an example of the tag information in this embodiment.

It is assumed that the article 50 is placed in a horizontal direction along the X-axis shown in FIG. 1 or in a vertical direction along the Y-axis. Then, it is assumed that the RFID tag 40 attached to the article 50 also exists along the X-axis or the Y-axis.

When a plurality of RFID tags 40 reply to a radio wave emitted from the RFID antenna 6 at the same time, the wireless tag reading apparatus 10a cannot identify and read information of each RFID tag 40. Therefore, the wireless tag reading apparatus 10a includes a collision preventing algorithm (anti-collision) for reading the responses from the respective RFID tags 40 in sequence. It will be described later in detail.

When the wireless tag reading apparatus 10a is activated, the RFID tags 40 attached to the articles 50 within a range within which a radio wave emitted from the RFID antenna 6 can reach the RFID tags 40 enter a stand-by state by being fed with electric power from the emitted radio wave. The RFID tags 40 each include an inventory check flag. The inventory check flag is a flag indicating whether or not its information has been read (detected). Under the stand-by state, the inventory check flag of the RFID tag 40 is in an "undetected" state that is its initial value.

Next, the wireless tag reading apparatus 10a issues a select command in which the article type of a search target has been specified as a parameter. Accordingly, an RFID tag 40 of the RFID tags 40 that have entered the stand-by state, which is of the article type specified as the parameter, is activated. Next, the wireless tag reading apparatus 10a issues a query command. When the RFID tag 40 receives the query command, the RFID tag 40 shifts to a response state from the stand-by state and generates and transmits a random number message (RN16) for identifying the RFID tag 40 itself. When the wireless tag reading apparatus 10a receives the random number message, the wireless tag reading apparatus 10a transmits an acknowledgement (ACK) command including its random number message. When the RFID tag 40 receives the ACK command, the RFID tag 40 shifts to an approval state from the response state. Under this approval state, the RFID tag 40 transmits the above-mentioned EPC that is the unique identifier and sets the inventory check flag to be in a "detected" state.

The wireless tag reading apparatus 10a reads the EPC included in the received response wave. Then, since the RFID tag 40 that has transmitted the EPC sets the inventory check flag to be in the "detected" state, the RFID tag 40 does not react even if the wireless tag reading apparatus 10a issues the query command again. Since the RFID tag 40 in the detected state does not react, the wireless tag reading apparatus 10a does not read the RFID tag 40 in the detected state twice. Therefore, if there is a plurality of RFID tags 40, the wireless tag reading apparatus 10a is capable of identifying and reading each RFID tag 40.

(Description of Structure of RFID Antenna)

Figure 2:
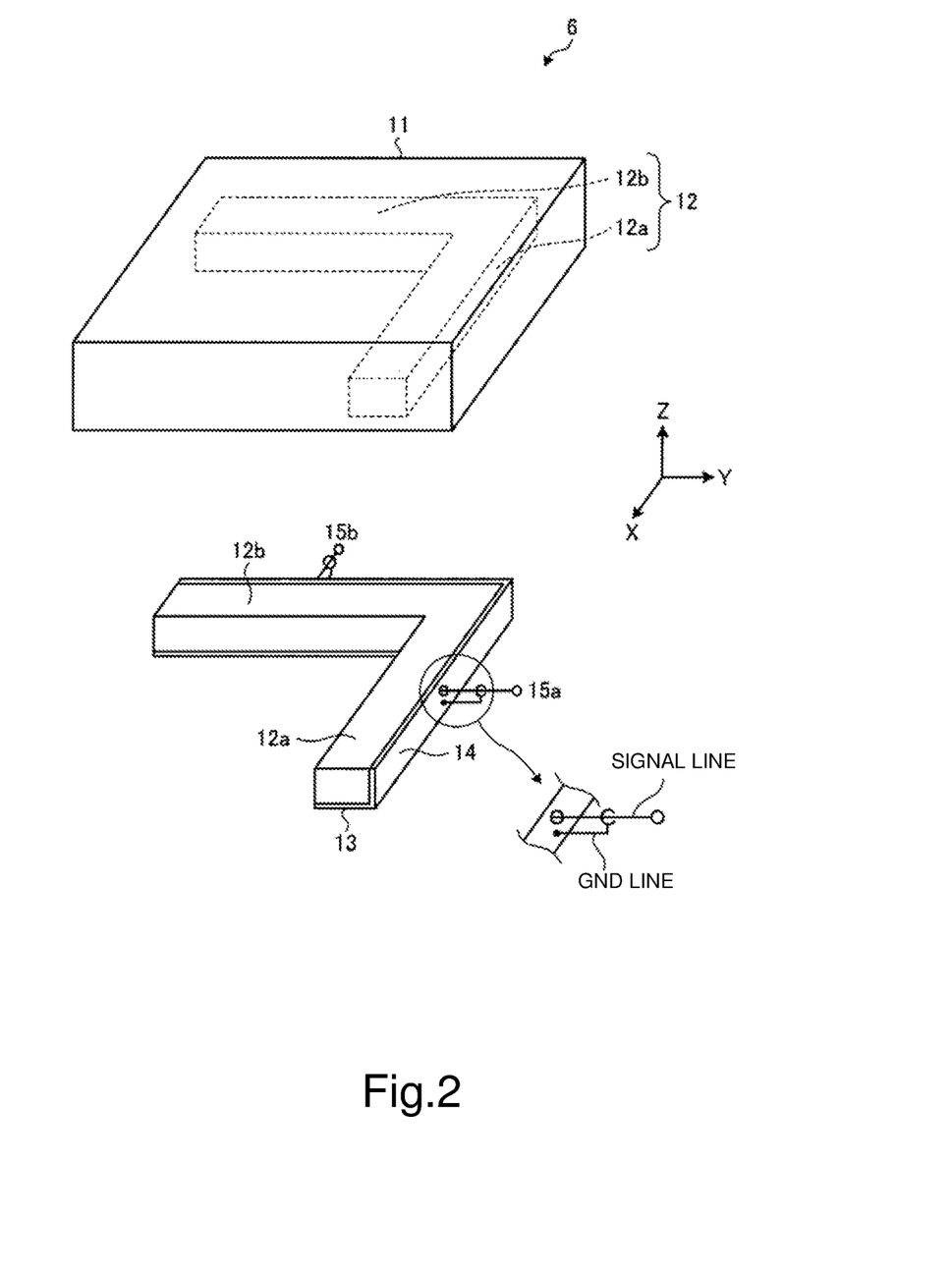
FIG. 2 is a diagram showing an example of a configuration of an RFID antenna.

Next, configurations of the RFID antenna 6 and power feeding ports 15a, 15b will be described with reference to FIG. 2. FIG. 2 is a diagram showing an example of the configuration of the RFID antenna.

The RFID antenna 6 is capable of emitting a first linearly polarized wave having a first plane of polarization and a second linearly polarized wave having a second plane of polarization different in direction from the first plane of polarization and receiving a response wave from the RFID tag 40. Specifically, the RFID antenna 6 has a structure in which an antenna element 12 is housed inside a rectangular casing 11. The antenna element 12 is a substrate antenna formed on a substrate, for example, and includes a first antenna element 12a along the X-axis and a second antenna element 12b along the Y-axis, the first antenna element 12a and the second antenna element 12b extending in directions different from each other by 90° while sharing a single vertex.

The first antenna element 12a has the rectangular shape along the X-axis and the second antenna element 12b has the rectangular shape along the Y-axis. Bottom surfaces of the first antenna element 12a and the second antenna element 12b are covered with a bottom surface conductor 13. Moreover, outer side surfaces of the first antenna element 12a and the second antenna element 12b are covered with a side surface conductor 14. The bottom surface conductor 13 and the side surface conductor 14 are conductors formed from metal and the like.

A power feeding port 15a feeds electric power into the RFID antenna so as to emit the first linearly polarized wave from the RFID antenna 6. Specifically, the first antenna element 12a is fed with a high-frequency signal from the power feeding port 15a via a signal line. It should be noted that the signal line is a coaxial cable covered with an insulator and an outer conductor. The outer conductor shields the signal line in such a manner that the input side and the output side are both connected to the GND. With this configuration, high-frequency signal current flows in the first antenna element 12a in an X-axis direction. Then, the first antenna element 12a emits a linearly polarized wave in the Z-axis direction, the linearly polarized wave having an XZ-plane as the plane of polarization. It should be noted that the power feeding port 15a is an example of a first power feeding unit in this embodiment. Moreover, the linearly polarized wave having the XZ-plane as the plane of polarization is an example of the first linearly polarized wave having the first plane of polarization in this embodiment.

Moreover, the power feeding port 15a feeds electric power into the RFID antenna so as to emit the first linearly polarized wave from the RFID antenna 6. Specifically, the second antenna element 12b is fed with a high-frequency signal from a power feeding port 15b via a signal line. The signal line is a coaxial cable as described above. With this configuration, high-frequency signal current flows in the second antenna element 12b in a Y-axis direction. Then, the second antenna element 12b emits a linearly polarized wave having a YZ-plane as the plane of polarization in a Z-axis direction. It should be noted that the power feeding port 15b is an example of a second power feeding unit in this embodiment. Moreover, the linearly polarized wave having the YZ-plane as the plane of polarization is an example of the second linearly polarized wave having the second plane of polarization in this embodiment.

In this manner, the linear antennas are arranged to be orthogonal to each other at the same position and only one of the antennas is fed with electric power, such that the linearly polarized wave having the plane of polarization according to the direction of the antenna can be emitted. Therefore, the linearly polarized wave having the plane of polarizations different from each other by 90° can be switched and emitted by feeding electric power into one antenna and the other antenna in a time division manner.

(Hardware Configuration of RFID Tag)

Figure 3:
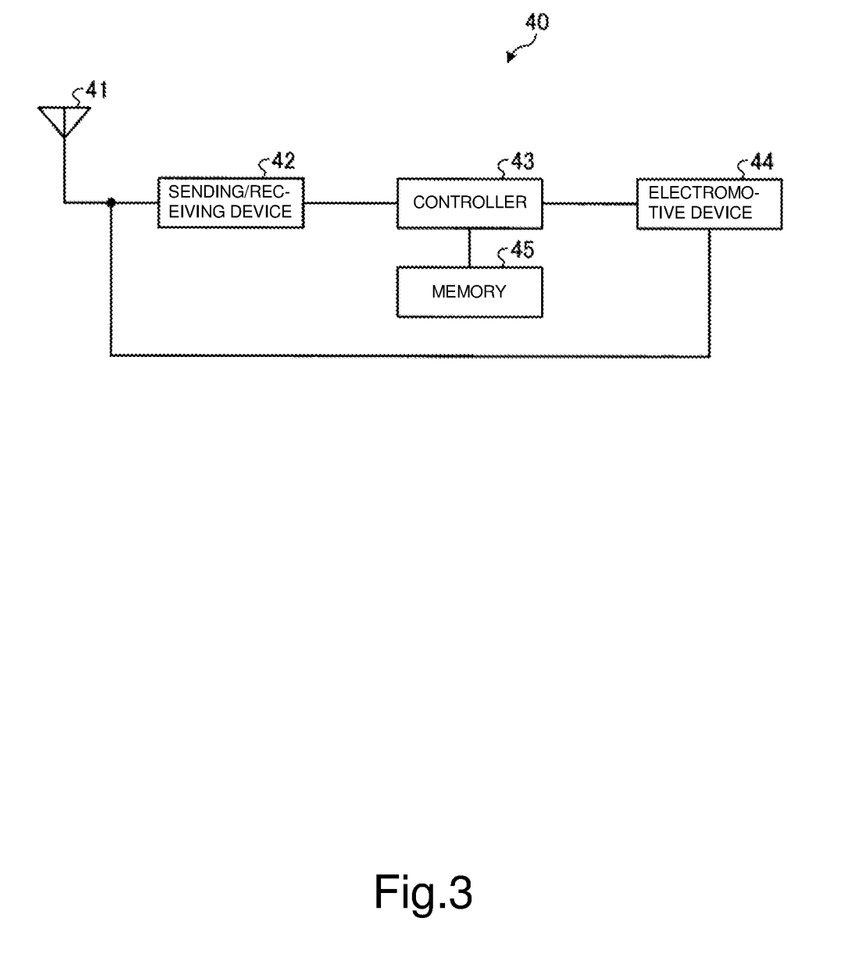
FIG. 3 is a block diagram showing an example of a hardware configuration of an RFID tag.

Next, a hardware configuration of the RFID tag 40 will be described with reference to FIG. 3. FIG. 3 is a block diagram showing an example of the hardware configuration of the RFID tag.

The RFID tag 40 includes an antenna 41, a transmitting/receiving device 42, a controller 43, an electromotive device 44, and a memory 45. The antenna 41 receives a radio wave emitted from the RFID antenna 6 of the wireless tag reading apparatus 10*a*. The transmitting/receiving device 42 transmits and receives a radio wave through the antenna 41. The controller 43 controls a general operation associated with reading of the RFID tag 40. The electromotive device 44 generates electric power for activating the RFID tag 40 on the basis of a radio wave that the antenna 41 has received from the wireless tag reading apparatus 10*a*. Moreover, the electromotive device 44 generates electric power for performing control to transmit the EPC (tag information) stored in the RFID tag 40 to the wireless tag reading apparatus 10*a*, for example. The memory stores the EPC (tag information) such as article information of the article with the RFID tag 40 attached thereto.

(Description of Hardware Configuration of Wireless Tag Reading Apparatus)

Figure 4:
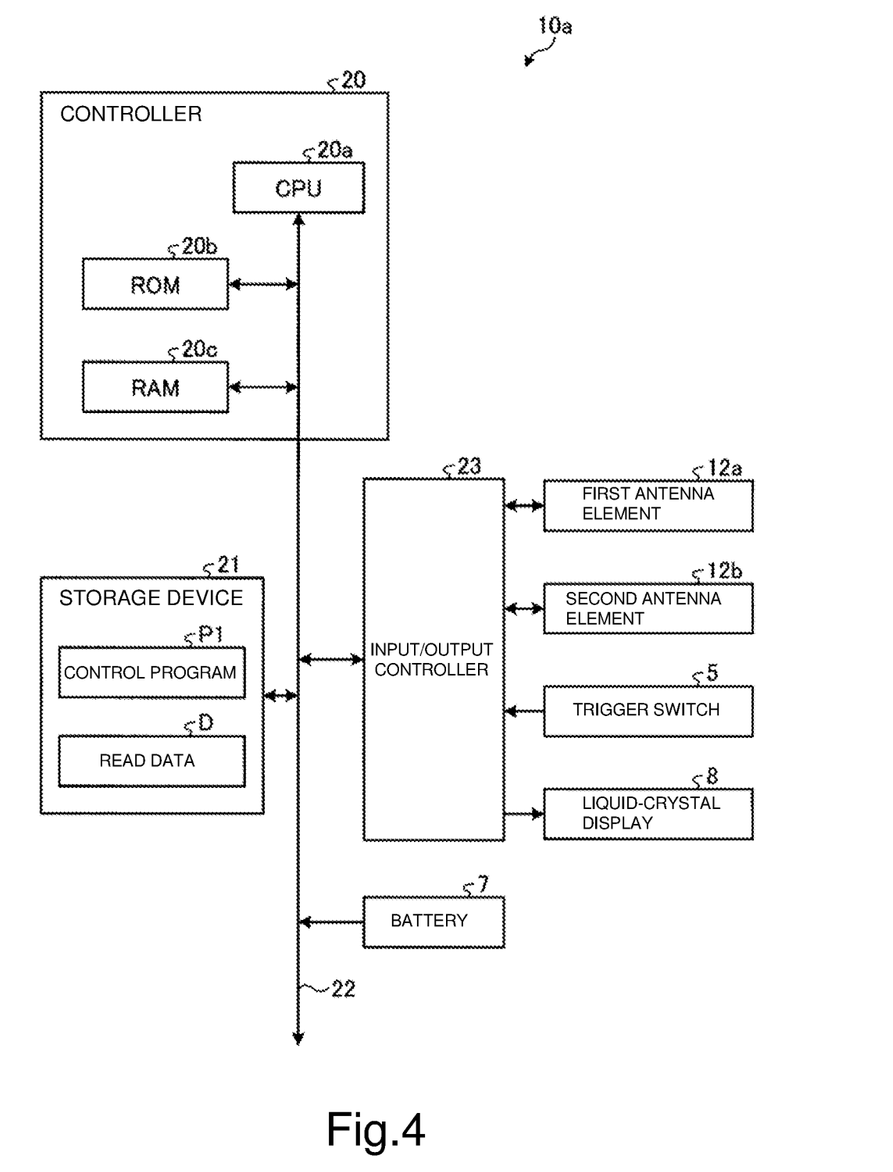
FIG. 4 is a block diagram showing an example of a hardware configuration of the wireless tag reading apparatus according to the first embodiment.

Next, a hardware configuration of the wireless tag reading apparatus 10*a* will be described with reference to FIG. 4. FIG. 4 is a hardware block diagram showing an example of the hardware configuration of the wireless tag reading apparatus according to the first embodiment.

The wireless tag reading apparatus 10*a* performs wireless communication with the RFID tags 40 attached to the articles and reads information associated with the articles stored in the RFID tag 40 for performing stock management, sales management, and the like of the articles. The wireless tag reading apparatus 10*a* includes a controller 20, a storage device 21, an input/output controller 23, and the battery 7.

The controller 20 connects the storage device 21 and the input/output controller 23 via an internal bus 22. The battery 7 supplies electric power into the respective portions of the wireless tag reading apparatus 10*a*.

The controller 20 includes a central processing unit (CPU) 20*a*, a read only memory (ROM) 20*b*, a random access memory (RAM) 20*c*. The CPU 20*a* connects to the ROM 20*b* and the RAM 20*c* via the internal bus 22. The CPU 20*a* expands various types of programs and files stored in the ROM 20*b* and/or the storage device 21, in the RAM 20*c*. The CPU 20*a* operates in accordance with the various types of programs and files expanded in the RAM 20*c* to thereby control the wireless tag reading apparatus 10*a*. That is, the controller 20 has a configuration of a generally-used computer.

The controller 20 further connects to the storage device 21, the input/output controller 23, and the battery 7 via the internal bus 22.

The storage device 21 is a nonvolatile memory such as a flash memory in which stored information is retained also when powered off, a hard disk drive (HDD), or the like. The storage device 21 stores programs and the like including a control program P1. The control program P1 is a program for executing the functions of the wireless tag reading apparatus 10*a*.

It should be noted that the control program P1 may be provided, stored in the ROM 20*b* in advance. Moreover, the control program P1 may be provided, recorded in a recording medium readable by a computer, such as a CD-ROM, a flexible disk (FD), a CD-R, and a digital versatile disc (DVD) in a file in an installable format or an executable format in the controller 20. In addition, the control program P1 may be stored in a computer connected to a network such as the Internet and may be provided by downloading it via the network. Moreover, the control program P1 may be provided or delivered via a network such as the Internet.

Moreover, the storage device 21 stores a read data D. The read data D is the EPC (tag information) or the like read by the wireless tag reading apparatus 10*a* from the RFID tag 40.

Referring back to FIG. 4, the input/output controller 23 connects the controller 20 to the first antenna element 12*a*, the second antenna element 12*b*, the trigger switch 5, and the liquid-crystal display 8. The input/output controller 23 controls various types of hardware connected on the basis of a command from the controller 20. In other words, the controller 20 controls various types of hardware connected via the input/output controller 23.

It should be noted that the functions of the first antenna element 12*a*, the second antenna element 12*b*, the trigger switch 5, and the liquid-crystal display 8 are as described above.

The battery 7 is a secondary battery such as a lithium-ion battery that supplies electric power into the wireless tag reading apparatus 10*a* and peripheral equipment connected to the wireless tag reading apparatus 10*a*.

(Description of Functional Configuration of Wireless Tag Reading Apparatus)

Figure 5:
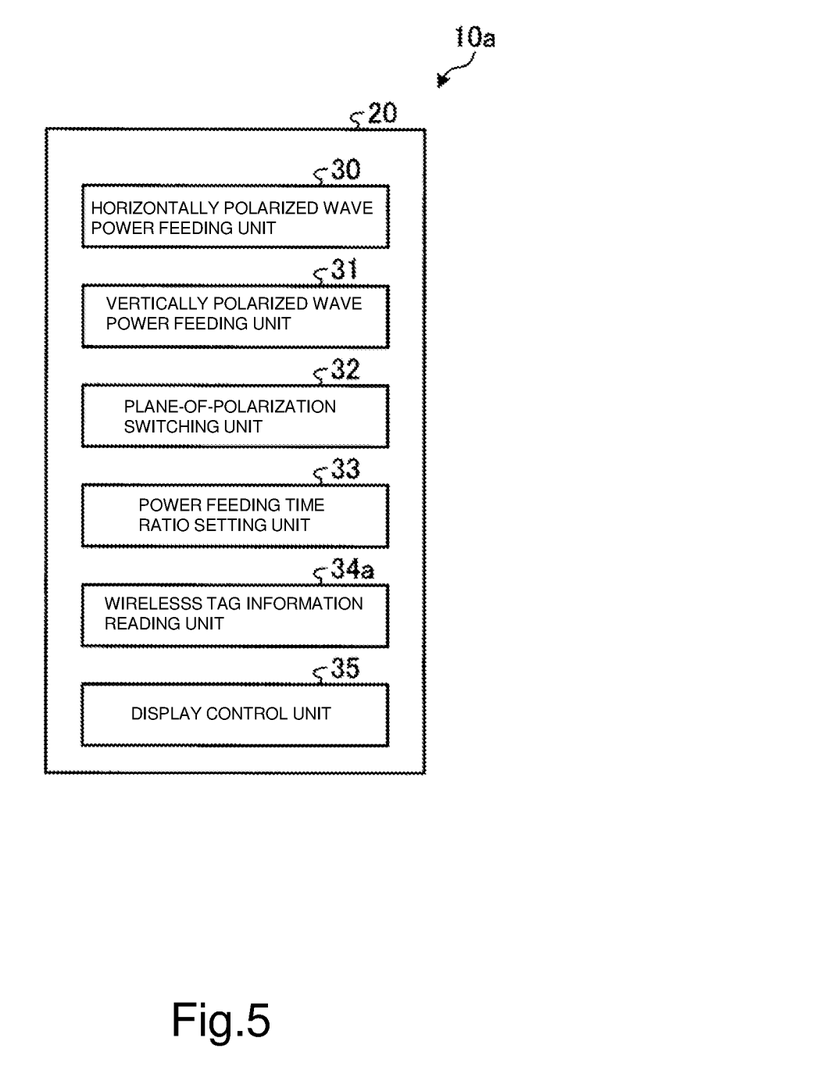
FIG. 5 is a block diagram showing an example of a functional configuration of the wireless tag reading apparatus according to the first embodiment.

Next, a functional configuration of the wireless tag reading apparatus 10*a* will be described with reference to FIG. 5. FIG. 5 is a block diagram showing an example of the functional configuration of the wireless tag reading apparatus according to the first embodiment.

By expanding the control program P1 in the RAM 20*c* and executing it, the controller 20 of the wireless tag reading apparatus 10*a* operates as a functional unit including a horizontally polarized wave power feeding unit 30, a vertically polarized wave power feeding unit 31, a plane-of-polarization switching unit 32, a power feeding time ratio setting unit 33, a wireless tag information reading unit 34*a*, and a display control unit 35 as shown in FIG. 5.

The horizontally polarized wave power feeding unit 30 emits from the first antenna element 12*a* a horizontally polarized wave (first linearly polarized wave) having a horizontal plane of polarization (first plane of polarization). It should be noted that the horizontally polarized wave power feeding unit 30 is an example of the first power feeding unit in this embodiment together with the above-mentioned power feeding port 15*a*.

The vertically polarized wave power feeding unit 31 emits from the second antenna element 12*b* a vertically polarized wave (second linearly polarized wave) having a perpendicular plane of polarization (second plane of polarization). It should be noted that the vertically polarized wave power feeding unit 31 is an example of the second power feeding unit in this embodiment together with the above-mentioned power feeding port 15b.

The plane-of-polarization switching unit 32 switches between power feeding into the first antenna element 12a from the power feeding port 15a under the control of the horizontally polarized wave power feeding unit 30 and power feeding into the second antenna element 12b from the power feeding port 15b under the control of the vertically polarized wave power feeding unit 31. In other words, the plane-of-polarization switching unit 32 switches between emission from the first antenna element 12a and emission from the second antenna element 12b.

The power feeding time ratio setting unit 33 sets a ratio of a time of power feeding into the first antenna element 12a from the power feeding port 15a under the control of the horizontally polarized wave power feeding unit 30 to a time of power feeding into the second antenna element 12b from the power feeding port 15b under the control of the vertically polarized wave power feeding unit 31 to take a value according to a ratio of the number of RFID tags 40 (wireless tags) existing in a direction of the horizontally polarized wave and the number of RFID tags 40 (wireless tags) existing in a direction of the vertically polarized wave. It should be noted that the power feeding time ratio setting unit 33 is an example of a setting unit in this embodiment.

The wireless tag information reading unit 34a receives via the RFID antenna 6 a response wave of a radio wave emitted by the RFID antenna 6 to thereby read the EPC (tag information) of the RFID tag 40. Specifically, the wireless tag information reading unit 34a sets a maximum bit length of a random number stored in a slot counter included in each RFID tag 40 in accordance with the number of tags N1 of the RFID tags 40 read by a response wave of a horizontally polarized wave and the number of tags N2 of the RFID tags 40 read by a response wave of a vertically polarized wave. The wireless tag information reading unit 34a sets the maximum bit length to thereby efficiently read all the EPCs (tag information) of the RFID tags 40. It will be described later in detail (see FIG. 6). It should be noted that the wireless tag information reading unit 34a is an example of a reading unit in this embodiment.

The display control unit 35 causes the liquid-crystal display 8 to display the EPCs and the like of the RFID tags 40 read by the wireless tag information reading unit 34a.

(Description of Plane-of-Polarization Switching Processing)

The plane-of-polarization switching unit 32 switches between power feeding into the first antenna element 12a from the power feeding port 15a under the control of the horizontally polarized wave power feeding unit 30 and power feeding into the second antenna element 12b from the power feeding port 15b under the control of the vertically polarized wave power feeding unit 31. Accordingly, the plane-of-polarization switching unit 32 switches between emission of the horizontally polarized wave (first linearly polarized wave) from the first antenna element 12a and emission of the vertically polarized wave (second linearly polarized wave) from the second antenna element 12b.

Then, the wireless tag information reading unit 34a reads the EPCs of the RFID tags 40 existing in the horizontal direction (along the X-axis of FIG. 1) by a response wave of the horizontally polarized wave emitted from the first antenna element 12a. Moreover, the wireless tag information reading unit 34a reads the EPCs of the RFID tags 40 existing in the vertical direction (along the Y-axis of FIG. 1) by a response wave of the vertically polarized wave emitted from the second antenna element 12b.

It should be noted that if the article 50 is placed in a direction deviated from the X-axis or the Y-axis, the EPC of the RFID tag 40 attached to the article 50 is read by both of the horizontally polarized wave and the vertically polarized wave or is not read by both of the horizontally polarized wave and the vertically polarized wave.

The plane-of-polarization switching unit 32 switches between emission of the horizontally polarized wave and emission of the vertically polarized wave at the time ratio set by the power feeding time ratio setting unit 33. In a case where a ratio (N1/N2) of the number of tags N1 of the articles 50 placed in the horizontal direction to the number of tags N2 of the articles 50 placed in the vertical direction is known in advance under a reading environment of the RFID tags 40, the operator of the wireless tag reading apparatus 10a gives a value according to this ratio to the power feeding time ratio setting unit 33. For example, in a case where the ratio (N1/N2) is 2, the operator gives an instruction to the power feeding time ratio setting unit 33 via the operation unit of the liquid-crystal display 8 such that the time to emit the horizontally polarized wave is about twice as long as the time to emit the vertically polarized wave, to thereby cause the power feeding time ratio setting unit 33 to set that ratio.

It should be noted that in a case where the ratio (N1/N2) is unknown because so many articles 50 are placed, the operator gives an instruction to the power feeding time ratio setting unit 33 such that the ratio of the time to emit the horizontally polarized wave to the time to emit the vertically polarized wave is a one to one ratio, to thereby cause the wireless tag reading apparatus 10a to perform preliminary reading of the RFID tags 40. Then, the power feeding time ratio setting unit 33 sets the ratio of the time to emit the horizontally polarized wave to the time to emit the vertically polarized wave on the basis of the number of tags of the RFID tags 40 read by the horizontally polarized wave and the number of tags of the RFID tags 40 read by the vertically polarized wave, to thereby cause the wireless tag information reading unit 34a to perform main reading.

(Description of Method of Reading Tag Information)

Figure 6:
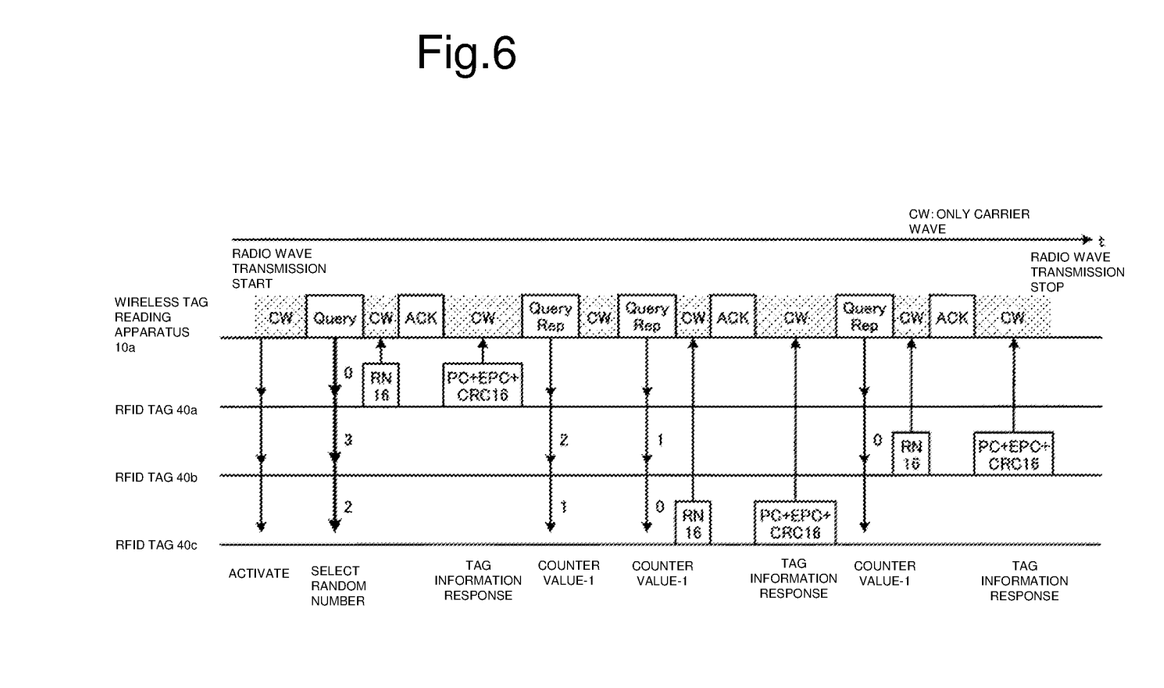
FIG. 6 is a time chart showing an example of a flow of processing performed by the wireless tag reading apparatus according to the first embodiment.

Next, a flow of processing of reading the RFID tags 40, which is performed by the controller 20 (wireless tag information reading unit 34a) of the wireless tag reading apparatus 10a, will be described with reference to FIG. 6. FIG. 6 is a time chart showing an example of the flow of processing performed by the wireless tag reading apparatus according to the first embodiment. The horizontal axis in FIG. 6 indicates a time t.

When the wireless tag reading apparatus 10a emits (transmits) a carrier wave CW (radio wave), the RFID tags 40 that have received this carrier wave are activated. Subsequently, the wireless tag reading apparatus 10a transmits a query command. The query command includes data for informing of a maximum value of the random number to be generated by each RFID tag 40 for avoiding the collision of the RFID tags 40. More specifically, that data is data regarding the maximum bit length of the slot counter that stores the random number generated by each RFID tag 40. When the RFID tag 40 receives the query command, the RFID tag 40 generates a random number equal to or smaller than the maximum value included in the query command and stores the the generated random number in its slot counter. In the example of FIG. 6, for the sake of description, it is assumed that the maximum value of the random number to be generated is "4" (the maximum bit length of the slot counter is 2). That is, the counter value that is set by each RFID tag 40 is 0, 1, 2, or 3.

In the example shown in FIG. 6, it is assumed that an RFID tag 40a generates a random number 0, an RFID tag 40b generates a random number 3, and an RFID tag 40c generates a random number 2. The random numbers generated in this manner are stored in the slot counters of the RFID tags, respectively.

The RFID tag 40a immediately transmits a response of RN16 because the counter value is 0. RN16 is a random number message having a maximum bit length of 16. When the wireless tag reading apparatus 10a receives RN16, the wireless tag reading apparatus 10a transmits an ACK command. When the RFID tag 40a receives the ACK command, the RFID tag 40a transmits PC+EPC+CRC 16 including the identification information. PC (protocol control) is information including information regarding a word length of the EPC, the presence/absence of a user memory, an extended indicator, and the like. The EPC is, as described above, the tag information for uniquely identifying the article 50 with the RFID tag 40 attached thereto. The CRC (cyclic redundancy check) 16 is a kind of error detection symbol.

The wireless tag reading apparatus 10a transmits a QueryRep command and decrements the counter value of the RFID tag 40a after receiving the signal including the identification information. When the RFID tag 40a receives the QueryRep command, the RFID tag 40a determines that the transmitted identification information is correctly transmitted.

When the RFID tag 40b and the RFID tag 40c receive the QueryRep command, the RFID tag 40b and the RFID tag 40c each decrement the counter value of the slot counter. As a result of decrement, the counter value of the RFID tag 40b is "2" and the counter value of the RFID tag 40c is "1", and thus there are no tags that transmit responses. In a case where the wireless tag reading apparatus 10a determines that no responses are transmitted even after a certain time elapses after transmitting the QueryRep command, the wireless tag reading apparatus 10a transmits a next QueryRep command. The RFID tags 40b and 40c each transmit a response when the counter value becomes 0.

When the wireless tag reading apparatus 10a performs transmitting a number of times corresponding to the maximum bit length designated by the query command (four in the example of FIG. 6), the wireless tag reading apparatus 10a stops transmission of the carrier wave.

Even in a case where the plurality of RFID tags 40 exist as described above, the wireless tag reading apparatus 10a makes it unlikely that the responses of the RFID tags 40 will collide with each other.

(Description of Flow of Processing Performed by Wireless Tag Reading Apparatus)

Figure 7:
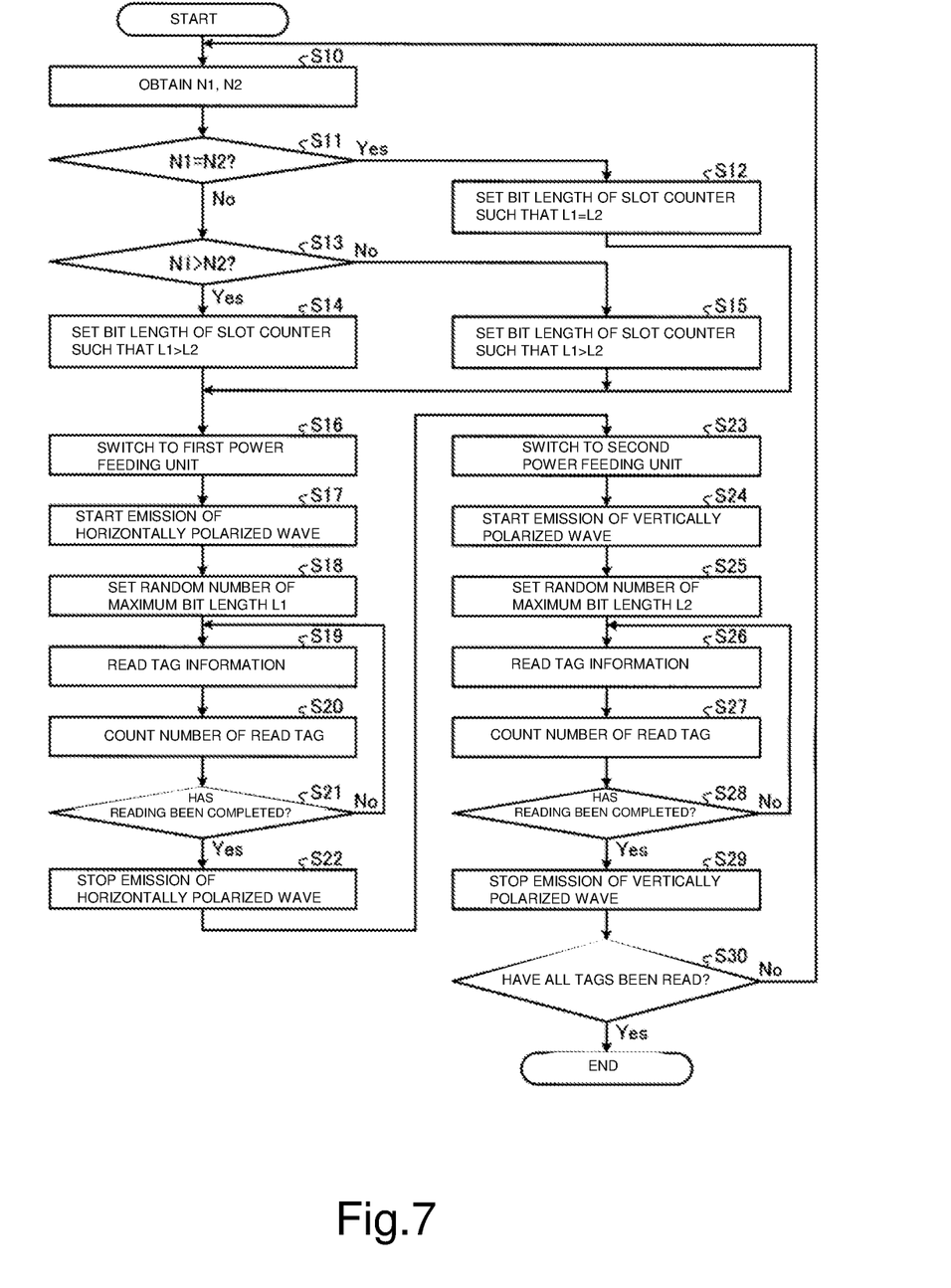
FIG. 7 is a flowchart showing an example of processing performed by the wireless tag reading apparatus according to the first embodiment.

Next, processing performed by the wireless tag reading apparatus 10a will be described with reference to FIG. 7. FIG. 7 is a flowchart showing an example of the processing performed by the controller 20 of the wireless tag reading apparatus 10a according to the first embodiment.

In Step S10, the power feeding time ratio setting unit 33 of the controller 20 obtains the number of tags N1 of the articles 50 placed in the horizontal direction and the number of tags N2 of the articles 50 placed in the vertical direction. Specifically, the operator of the wireless tag reading apparatus 10a may designate a rough number of tags checked by eyes via the operation unit of the liquid-crystal display 8, for example. Alternatively, in a case where a theoretical stock quantity of the articles 50 is known like inventory check work, a value of the half of the stock quantity may be designated as each of the number of tags N1 and the number of tags N2.

In Step S11, the power feeding time ratio setting unit 33 of the controller 20 determines whether or not the number of tags N1 and the number of tags N2 are equal. In a case where it is determined that the number of tags N1 and the number of tags N2 are equal (Yes in Step S11), the processing of the controller 20 proceeds to Step S12. On the other hand, in a case where it is determined that the number of tags N1 and the number of tags N2 are not equal (No in Step S11), the processing of the controller 20 proceeds to Step S13.

In Step S12, the wireless tag information reading unit 34a of the controller 20 sets a maximum bit length L1 of the slot counter of the RFID tag 40 read when emitting the horizontally polarized wave and a maximum bit length L2 of the slot counter of the RFID tag 40 read when emitting the vertically polarized wave such that the relation L1=L2 is established. Then, the processing of the controller 20 proceeds to Step S16.

On the other hand, in Step S13, the power feeding time ratio setting unit 33 of the controller 20 determines whether or not the number of tags N1 is equal to or larger than the number of tags N2. In a case where it is determined that the number of tags N1 is equal to or larger than the number of tags N2 (Yes in Step S13), the processing of the controller 20 proceeds to Step S14. On the other hand, it is determined that the number of tags N1 is not equal to or larger than the number of tags N2 (No in Step S13), the processing of the controller 20 proceeds to Step S15.

In Step S14, the wireless tag information reading unit 34a of the controller 20 sets the maximum bit length L1 of the slot counter of the RFID tag 40 read when emitting the horizontally polarized wave and the maximum bit length L2 of the slot counter of the RFID tag 40 read when emitting the vertically polarized wave such that the relation L1>L2 is established. Then, the processing of the controller 20 proceeds to Step S16.

On the other hand, in Step S15, the wireless tag information reading unit 34a of the controller 20 sets the maximum bit lengths L1 and L2 of the slot counters such that the relation L1<L2 is established. Then, the processing of the controller 20 proceeds to Step S16.

In Step S16 following the processing of Step S12, Step S4, or Step S15, the plane-of-polarization switching unit 32 of the controller 20 switches the power feeding control unit to the horizontally polarized wave power feeding unit 30 (first power feeding unit).

In Step S17, the horizontally polarized wave power feeding unit 30 of the controller 20 starts emission of the horizontally polarized wave (first linearly polarized wave) from the first antenna element 12a.

In Step S18, the wireless tag information reading unit 34a of the controller 20 causes each RFID tag 40 that has received the horizontally polarized wave to generate a random number of the maximum bit length L1 in accordance with the query command transmitted superimposed on the horizontally polarized wave.

In Step S18, the wireless tag information reading unit 34a of the controller 20 reads the tag information from each RFID tag 40.

In Step S20, the wireless tag information reading unit 34a of the controller 20 counts the number of read tags.

In Step S21, the wireless tag information reading unit 34a of the controller 20 determines whether or not reading of the tag information of the RFID tag 40 has been completed. In a case where it is determined that reading of the tag information of the RFID tag 40 has been completed (Yes in Step S21), the processing of the controller 20 proceeds to Step S22. On the other hand, in a case where it is determined that reading of the tag information of the RFID tag 40 has not been completed (No in Step S21), the processing of the controller 20 returns to Step S19.

It should be noted that in Step S21, the determination of the controller 20 as to whether or not reading of the tag information of the RFID tag 40 has been completed is performed by determining whether or not the wireless tag reading apparatus 10a has performed transmission a number of times corresponding to the maximum bit length designated by the query command.

In Step S22, the horizontally polarized wave power feeding unit 30 of the controller 20 stops emission of the horizontally polarized wave (first linearly polarized wave) from the first antenna element 12a.

Next, in Step S23, the plane-of-polarization switching unit 32 of the controller 20 switches the power feeding control unit to the vertically polarized wave power feeding unit 31 (second power feeding unit).

In Step S24, the vertically polarized wave power feeding unit 31 of the controller 20 starts emission of the vertically polarized wave (second linearly polarized wave) from the second antenna element 12b.

In Step S25, the wireless tag information reading unit 34a of the controller 20 causes each RFID tag 40 that has received the vertically polarized wave to generate a random number of the maximum bit length L2 in accordance with the query command transmitted superimposed on the vertically polarized wave.

In Step S26, the wireless tag information reading unit 34a of the controller 20 reads the tag information from each RFID tag 40.

In Step S27, the wireless tag information reading unit 34a of the controller 20 counts the number of read tags.

In Step S28, the wireless tag information reading unit 34a of the controller 20 determines whether or not reading of the tag information of the RFID tag 40 has been completed. In a case where it is determined that reading of the tag information of the RFID tag 40 has been completed (Yes in Step S28), the processing of the controller 20 proceeds to Step S29. On the other hand, in a case where it is determined that reading of the tag information of the RFID tag 40 has not been completed (No in Step S28), the processing of the controller 20 returns to Step S26.

It should be noted that in Step S28, the determination as to whether or not reading of the tag information of the RFID tag 40 has been completed is performed by determining whether or not the wireless tag reading apparatus 10a has performed transmission a number of times corresponding to the maximum bit length designated by the query command.

In Step S29, the vertically polarized wave power feeding unit 31 of the controller 20 stops emission of the vertically polarized wave (second linearly polarized wave) from the second antenna element 12b.

In Step S30 following Step S29, the wireless tag information reading unit 34a of the controller 20 determines whether or not reading of all the RFID tags 40 has been completed. In a case where it is determined that reading of all the RFID tags 40 has been completed (Yes in Step S30), the controller 20 of the wireless tag reading apparatus 10a terminates the processing of FIG. 7. On the other hand, in a case where it is determined that reading of all the RFID tags 40 has not been completed (No in Step S30), the processing of the controller 20 returns to Step S10.

It should be noted that in Step S30, the determination as to whether or not all the RFID tags 40 have been read may be performed by a method depending on situations where the wireless tag reading apparatus 10a is used. For example, in a case where the wireless tag reading apparatus 10a is performing stock taking of the articles 50, it is sufficient to determine whether or not all the RFID tags 40 have been read by checking the contents of the read tag information against management information of the stock taking. Moreover, in a case where the wireless tag reading apparatus 10a is performing reading of commodity information of the articles to be purchased by a customer, it is sufficient to determine whether or not all the RFID tags 40 have been read by checking the number of read articles 50 against the number of articles 50 that the operator of the wireless tag reading apparatus 10a has checked by eyes.

As described above, in accordance with the wireless tag reading apparatus 10a according to the first embodiment, the power feeding time ratio setting unit 33 (setting unit) sets the ratio of the time to feed electric power into the first antenna element 12a from the power feeding port 15a under the control of the horizontally polarized wave power feeding unit (first power feeding unit) to the time to feed electric power into the second antenna element 12b from the power feeding port 15b under the control of the vertically polarized wave power feeding unit 31 (second power feeding unit) to take the value according to the ratio of the number of wireless tags existing in the direction of the first linearly polarized wave to the number of wireless tags existing in the direction of the second linearly polarized wave. Then, the plane-of-polarization switching unit 32 switches between power feeding into the first antenna element 12a from the power feeding port 15a under the control of the horizontally polarized wave power feeding unit 30 (first power feeding unit) and power feeding into the second antenna element 12b from the power feeding port 15b under the control of the vertically polarized wave power feeding unit 31 (second power feeding unit) at the ratio of the power feeding time set by the power feeding time ratio setting unit 33. Then, the wireless tag information reading unit 34a (reading unit) receives a response wave of the first linearly polarized wave or the second linearly polarized wave to thereby read the tag information of the RFID tag 40 (wireless tag) included in the response wave. Therefore, all the EPCs (tag information) of the RFID tags 40 can be efficiently read while securing the communication distance with the plurality of RFID tags 40 the direction of arrangement of which is unknown.

Moreover, in the wireless tag reading apparatus 10a according to the first embodiment, the value according to the ratio of the number of RFID tags 40 existing in the direction of the first linearly polarized wave and the number of RFID tags 40 existing in the direction of the second linearly polarized wave is the ratio of the number of RFID tags 40 read by the horizontally polarized wave (first linearly polarized wave) to the number of RFID tags 40 read by the vertically polarized wave (second linearly polarized wave). Therefore, the time required for reading all the RFID tags 40 can be shortened by changing the time to emit a radio wave for example, in accordance with the number of tags of the RFID tags 40 of the articles 50 placed in a direction along the linearly polarized wave emitted by the wireless tag reading apparatus 10a. Moreover, in a case where the number of tags of the RFID tags 40 is unknown and the horizontally polarized wave and the vertically polarized wave have been emitted for the same time for example, the ratio of the time to emit the horizontally polarized wave to the time to emit the vertically polarized wave can also be changed on the basis of the number of tags of the RFID tags 40 read by the horizontally polarized wave and the number of tags of the RFID tags 40 read by the vertically polarized wave when performing reading again.

Moreover, in the wireless tag reading apparatus 10a according to the first embodiment, the power feeding time ratio setting unit 33 (setting unit) sets the maximum bit length of the slot counter set in the RFID tag 40 when emitting the horizontally polarized wave and the maximum bit length of the slot counter set in the RFID tag 40 when emitting the vertically polarized wave in accordance with the ratio of the number of RFID tags 40 read by the horizontally polarized wave (first linearly polarized wave) to the number of RFID tags 40 read by the vertically polarized wave (second linearly polarized wave). Therefore, when emitting radio wave of the horizontally polarized wave and the vertically polarized wave, which are envisaged to be capable of reading a larger number of RFID tags 40, all the RFID tags 40 can be reliably read while saving the total reading time by reliably performing reading of the RFID tag 40 by those radio waves.

Moreover, in the wireless tag reading apparatus 10a according to the first embodiment, the power feeding time ratio setting unit 33 (setting unit) sets, in a case where the number of RFID tags 40 read by the horizontally polarized wave (first linearly polarized wave) is larger than the number of RFID tags 40 read by the vertically polarized wave (second linearly polarized wave), the maximum bit length of the slot counter set in the RFID tag 40 when emitting the horizontally polarized wave to be longer than the maximum bit length of the slot counter set in the RFID tag 40 when emitting the vertically polarized wave. Therefore, in a case where a larger number of RFID tags 40 exist in the horizontal direction than in the vertical direction, the time to emit the horizontally polarized wave is set to be longer than the time to emit the vertically polarized wave. On the contrary, in a case where a larger number of RFID tags 40 exist in the vertical direction than in the horizontal direction, the maximum bit length of the slot counter set in the RFID tag 40 when emitting the vertically polarized wave is set to be longer than the maximum bit length of the slot counter set in the RFID tag 40 when emitting the horizontally polarized wave. Therefore, the time to emit the vertically polarized wave is set to be longer than the time to emit the horizontally polarized wave. With this configuration, all the EPCs (tag information) of the RFID tags 40 can be efficiently read irrespective of the direction of placement of the RFID tags 40.

Second Embodiment

Hereinafter, a wireless tag reading apparatus 10b and a control method for the wireless tag reading apparatus 10b according to a second embodiment will be described. It should be noted that the hardware configuration of the wireless tag reading apparatus 10b is the same as the hardware configuration (see FIG. 4) of the wireless tag reading apparatus 10a, and thus a description thereof will be omitted.

(Description of Overall Configuration of Wireless Tag Reading Apparatus)

Figure 8:
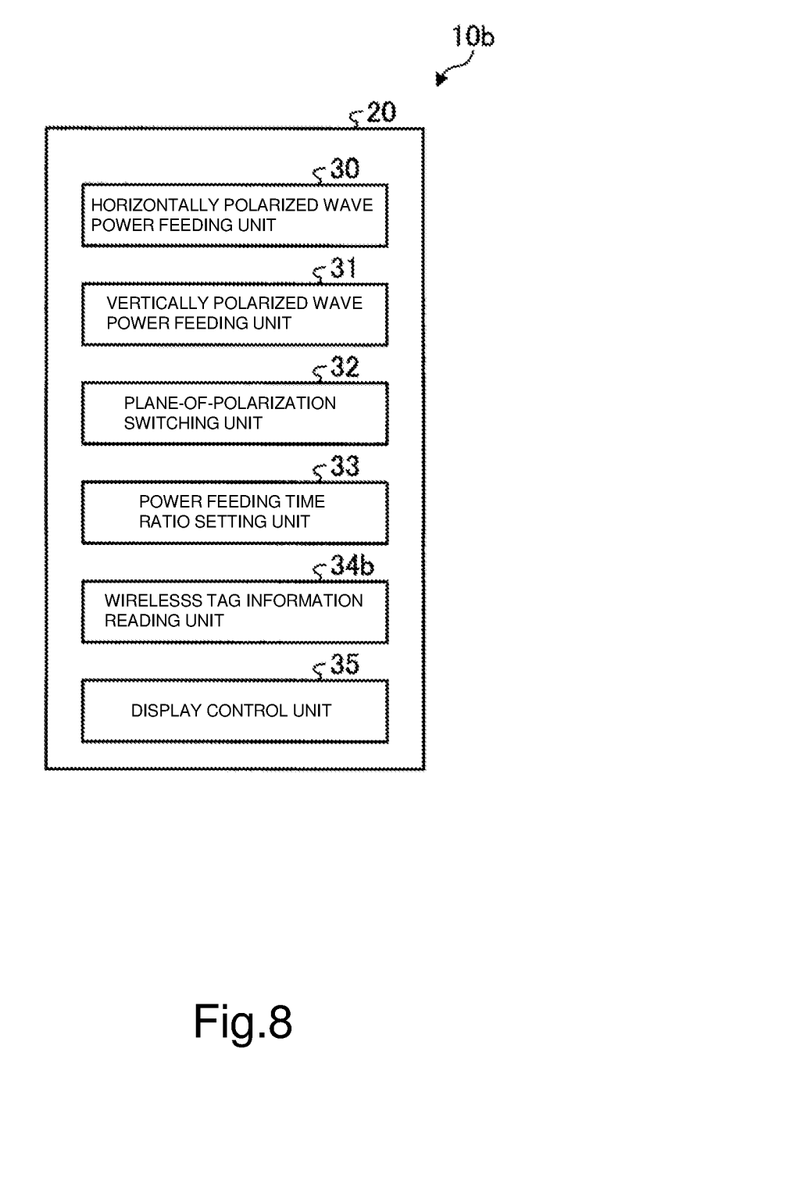
FIG. 8 is a block diagram showing an example of a functional configuration of a wireless tag reading apparatus according to a second embodiment.

FIG. 8 is a block diagram showing an example of a functional configuration of the wireless tag reading apparatus 10b according to the second embodiment. The controller 20 of the wireless tag reading apparatus 10b includes a wireless tag information reading unit 34b instead of the wireless tag information reading unit 34a of the controller 20 of the wireless tag reading apparatus 10a.

The wireless tag information reading unit 34b reads the EPC (tag information) of the RFID tag 40 by receiving the response wave to the radio wave emitted by the RFID antenna 6. Specifically, the wireless tag information reading unit 34b repeats the processing from the start of radio wave transmission and the stop of radio wave transmission a number of times corresponding to the number of tags of the RFID tags 40. With this configuration, the wireless tag information reading unit 34b efficiently reads all the EPCs (tag information) of the RFID tags 40. It will be described later in detail. It should be noted that the wireless tag information reading unit 34b is an example of the reading unit in this embodiment.

(Description of Method of Reading Tag Information)

Next, processing of reading the RFID tags 40, which is performed by the wireless tag information reading unit 34b of the wireless tag reading apparatus 10b, will be described. Irrespective of emission of the horizontally polarized wave and emission of the vertically polarized wave, the wireless tag information reading unit 34b individually sets the number of times to repeat the processing (inventory round) from the start of radio wave transmission to the stop of radio wave transmission described in FIG. 6 when emitting the horizontally polarized wave and when emitting the vertically polarized wave without changing the maximum bit length of the slot counter set in each RFID tag 40.

That is, when emitting a polarized wave closer to a direction in which the number of tags of the RFID tags 40 is larger, the number of times to repeat the processing shown in FIG. 6 is set to be larger. With this configuration, the RFID tags 40 not read in first reading processing can be reliably read in second, third, . . . reading processing. It should be noted that at this time, it is desirable that the operator of the wireless tag reading apparatus 10b perform reading by moving the RFID antenna 6 of the wireless tag reading apparatus 10b closer to the article 50 or changing the direction of the RFID antenna 6 of the wireless tag reading apparatus 10b for changing the positional relationship between the RFID tag 40 and the RFID antenna 6.

(Description of Flow of Processing Performed by Wireless Tag Reading Apparatus)

Figure 9:
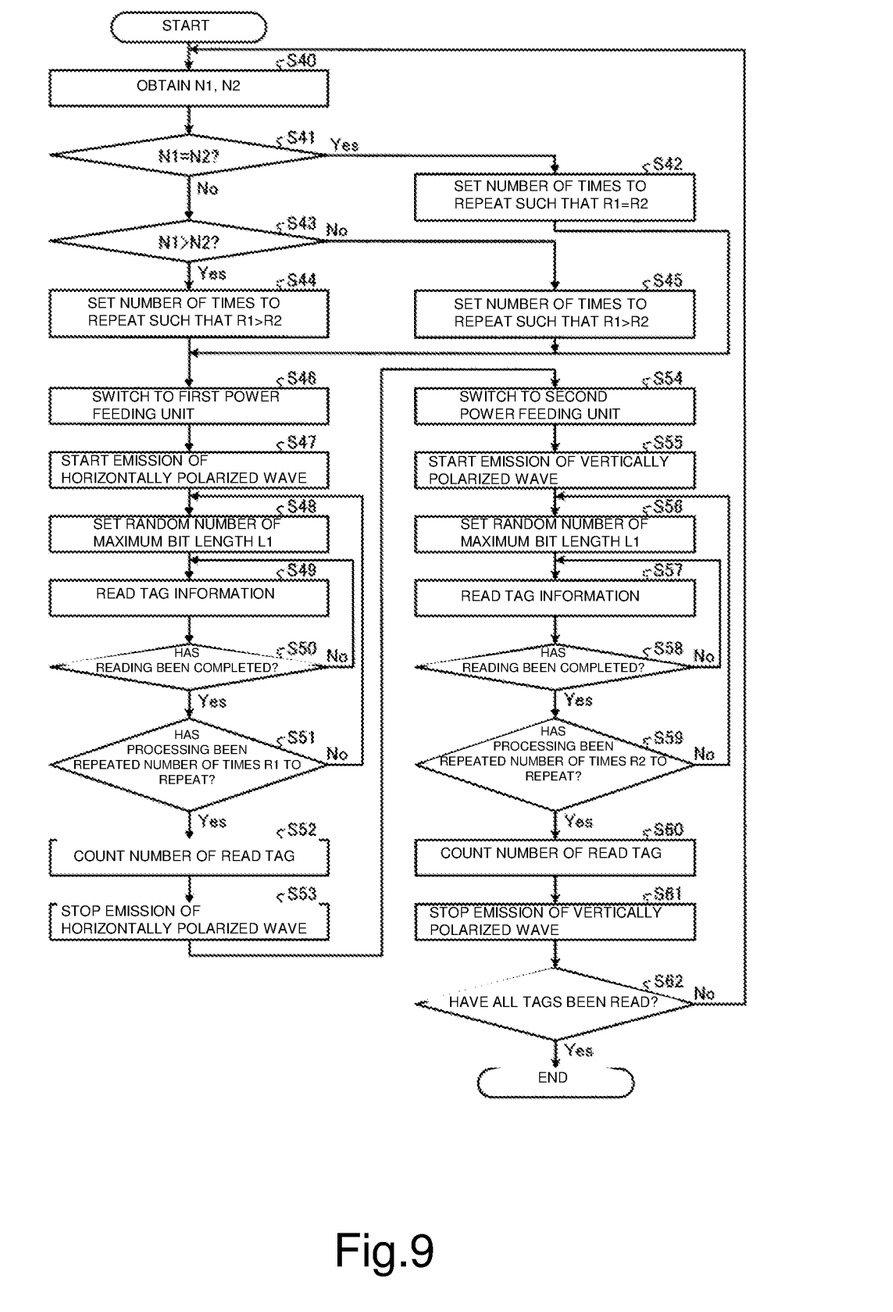
FIG. 9 is a flowchart showing an example of processing performed by the wireless tag reading apparatus according to the second embodiment.

Next, processing performed by the wireless tag reading apparatus 10b will be described with reference to FIG. 9. FIG. 9 is a flowchart showing an example of the processing performed by the wireless tag reading apparatus 10b according to the second embodiment.

In Step S40, the power feeding time ratio setting unit 33 of the controller 20 obtains the number of tags N1 of the articles 50 placed in the horizontal direction and the number of tags N2 of the articles 50 placed in the vertical direction.

In Step S41, the power feeding time ratio setting unit 33 of the controller 20 determines whether or not the number of tags N1 and the number of tags N2 are equal. In a case where it is determined that the number of tags N1 and the number of tags N2 are equal (Yes in Step S41), the processing of the controller 20 proceeds to Step S42. On the other hand, in a case where it is determined that the number of tags N1 and the number of tags N2 are equal (No in Step S41), the processing of the controller 20 proceeds to Step S43.

In Step S42, the wireless tag information reading unit 34b of the controller 20 sets the number of times R1 to repeat the inventory round when emitting the horizontally polarized wave and the number of times R2 to repeat the inventory round when emitting the vertically polarized wave such that the relation R1=R2 is established. Then, the processing of the controller 20 proceeds to Step S46.

On the other hand, in Step S43, the power feeding time ratio setting unit 33 of the controller 20 determines whether or not the number of tags N1 is equal to or larger than the number of tags N2. In a case where it is determined that the number of tags N1 is equal to or larger than the number of tags N2 (Yes in Step S43), the processing of the controller 20 proceeds to Step S44. On the other hand, it is determined that the number of tags N1 is not equal to or larger than the number of tags N2 (No in Step S43), the processing of the controller 20 proceeds to Step S45.

In Step S44, the wireless tag information reading unit 34b of the controller 20 sets the number of times R1 to repeat the inventory round when emitting the horizontally polarized wave and the number of times R2 to repeat the inventory round when emitting the vertically polarized wave such that the relation R1>R2 is established. Then, the processing of the controller 20 proceeds to Step S46.

On the other hand, in Step S45, the wireless tag information reading unit 34b of the controller 20 sets the number of times R1 to repeat the inventory round and the number of times R2 to repeat the inventory round such that the relation R1<R2 is established (Step S45). Then, the processing of the controller 20 proceeds to Step S46.

In Step S46 following the processing of Step S42, Step S44, or Step S45, the plane-of-polarization switching unit 32 of the controller 20 switches the power feeding control unit to the horizontally polarized wave power feeding unit 30 (first power feeding unit).

In Step S47, the horizontally polarized wave power feeding unit 30 of the controller 20 starts emission of the horizontally polarized wave (first linearly polarized wave) from the first antenna element 12a.

In Step S48, the wireless tag information reading unit 34b of the controller 20 generates the random number of the maximum bit length L1 in each RFID tag 40 that has received the horizontally polarized wave in accordance with the query command transmitted superimposed on the horizontally polarized wave.

In Step S49, the wireless tag information reading unit 34b of the controller 20 reads the tag information from each RFID tag 40.

In Step S50, the wireless tag information reading unit 34b of the controller 20 determines whether or not reading of the tag information of the RFID tag 40 has been completed. In a case where it is determined that reading of the tag information of the RFID tag 40 has been completed (Yes in Step S50), the processing of the controller 20 proceeds to Step S51. On the other hand, in a case where it is determined that reading of the tag information of the RFID tag 40 has not been completed (No in Step S50), the processing of the controller 20 returns to Step S49.

In Step S51, the wireless tag information reading unit 34b of the controller 20 determines whether or not the inventory round has been repeated the number of times R1 to repeat. In a case where it is determined that the inventory round has been repeated the number of times R1 to repeat (Yes in Step S51), the processing of the controller 20 proceeds to Step S52. On the other hand, in a case where it is determined that the inventory round has been repeated the number of times R1 to repeat (No in Step S51), the processing of the controller 20 returns to Step S48. The controller 20 performs the processing of Steps S48 to S51 for a next inventory round.

In Step S52, the wireless tag information reading unit 34b of the controller 20 counts the number of read tags.

Next, in Step S53, the horizontally polarized wave power feeding unit 30 of the controller 20 stops emission of the horizontally polarized wave (first linearly polarized wave) from the first antenna element 12a.

Subsequently, in Step S54, the plane-of-polarization switching unit 32 of the controller 20 switches the power feeding control unit to the vertically polarized wave power feeding unit 31 (second power feeding unit).

In Step S55, the vertically polarized wave power feeding unit 31 of the controller 20 starts emission of the vertically polarized wave (second linearly polarized wave) from the second antenna element 12b.

In Step S56, the wireless tag information reading unit 34b of the controller 20 causes each RFID tag 40 that has received the vertically polarized wave to generate the random number of the maximum bit length L1 in accordance with the query command transmitted superimposed on the vertically polarized wave.

In Step S57, the wireless tag information reading unit 34b of the controller 20 reads the tag information from each RFID tag 40.

In Step S58, the wireless tag information reading unit 34b of the controller 20 determines whether or not reading of the tag information of the RFID tag 40 has been completed. In a case where it is determined that reading of the tag information of the RFID tag 40 has been completed (Yes in Step S58), the processing of the controller 20 proceeds to Step S59. On the other hand, in a case where it is determined that reading of the tag information of the RFID tag 40 has not been completed (No in Step S58), the processing of the controller 20 returns to Step S57.

In Step S59, the wireless tag information reading unit 34b of the controller 20 determines whether the inventory round has been repeated a number of times to repeat R2. In a case where it is determined that the inventory round has been repeated the number of times to repeat R2 (Yes in Step S59), the processing of the controller 20 proceeds to Step S60. On the other hand, in a case where it is determined that the inventory round has not been repeated the number of times to repeat R2 (No in Step S59), the processing of the controller 20 returns to Step S56. The controller 20 performs the the processing of Steps S56 to S58 for a next inventory round.

In Step S60, the wireless tag information reading unit 34b of the controller 20 counts the number of read tags.

Next, in Step S61, the vertically polarized wave power feeding unit 31 of the controller 20 stops emission of the vertically polarized wave (second linearly polarized wave) from the second antenna element 12b.

Next, in Step S62, the wireless tag information reading unit 34b of the controller 20 determines whether or not reading of all the RFID tags 40 has been completed. In a case where it is determined that reading of all the RFID tags 40 has been completed (Yes in Step S62), the wireless tag reading apparatus 10b terminates the processing of FIG. 9. On the other hand, in a case where it is not determined that reading of all the RFID tags 40 has been completed (No in Step S62), the processing of the controller 20 returns to Step S40.

As described above, in the wireless tag reading apparatus 10b according to the second embodiment, the power feeding time ratio setting unit 33 (setting unit) sets the number of times to repeat the inventory round in accordance with the ratio of the number of read tags N1 of the RFID tags by the use of the horizontally polarized wave (first linearly polarized wave) and the number of read tags N2 of the RFID tags 40 by the use of the vertically polarized wave (second linearly polarized wave) when emitting the horizontally polarized wave and when emitting the vertically polarized wave. Therefore, the tag information of all the RFID tags 40 can be efficiently read while securing the communication distance with the plurality of RFID tags 40 the direction of arrangement of which is unknown.

Moreover, in the wireless tag reading apparatus 10b according to the second embodiment, the power feeding time ratio setting unit 33 (setting unit) sets the number of times to repeat the inventory round when emitting the horizontally polarized wave to be larger than the number of times to repeat the inventory round when emitting the vertically polarized wave in a case where the number of read tags N1 of the RFID tags 40 by the use of the horizontally polarized wave (first linearly polarized wave) is larger than the number of read tags N2 of the RFID tags 40 by the use of the vertically polarized wave (second linearly polarized wave). Therefore, the time to emit the horizontally polarized wave is set to be longer than the time to emit the vertically polarized wave. On the contrary, in a case where a larger number of RFID tag 40s exist in the vertical direction than the horizontal direction, the power feeding time ratio setting unit 33 (setting unit) sets the number of times to repeat the inventory round when emitting the vertically polarized wave to be larger than the number of times to repeat the inventory round when emitting the horizontally polarized wave. Therefore, the time to emit the vertically polarized wave is set to be longer than the time to emit the horizontally polarized wave. With this configuration, all the RFID tags 40 can be efficiently read irrespective of the direction of placement of the RFID tags 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reading apparatus that performs wireless communication with a wireless tag that stores information, the wireless tag reading apparatus comprising:
   an antenna capable of emitting a first linearly polarized wave having a first plane of polarization and a second linearly polarized wave having a second plane of polarization, the second plane of polarization having an orientation that is different from that of the first plane of polarization;
   first and second power feeding ports to which electric power is supplied, the antenna emitting the first linearly polarized wave when the electric power is supplied to the first power feeding port and the second linearly polarized wave when the electric power is supplied to the second power feeding port; and
   a controller configured to
      determine a ratio of a number of first wireless tags that are responsive to the first linearly polarized wave to a number of second wireless tags that are responsive to the second linearly polarized wave,
      set a ratio of a time of power feeding to the first power feeding port to a time of power feeding to the second power feeding port according to the determined ratio, and
      switch between the power feeding to the first power feeding port and the power feeding to the second power feeding port in accordance with the set ratio of the power feeding times, and upon receipt of a response wave that is responding to the first linearly polarized wave or the second linearly polarized wave via the antenna, read the information of the wireless tag included in the response wave, wherein
   the controller is further configured to set, in accordance with the determined ratio, a first maximum bit length of a slot counter of each of the first wireless tags and a second maximum bit length of a slot counter of each of the second wireless tags.

2. The wireless tag reading apparatus according to claim 1, wherein
   the controller
      sets, in a case where the number of the first wireless tags s larger than the number of the second wireless tags, the first maximum bit length to be longer than the second maximum bit length, and
      sets, in a case where the number of the second wireless tags is larger than the number of the first wireless tags, the second maximum bit length to be longer than the first maximum bit length.

3. The wireless tag reading apparatus according to claim 1, wherein
   the controller is further configured to set, in accordance with the determined ratio, a number of times to repeat a first inventory round in which the first linearly polarized wave is emitted to the first wireless tags and a number of times to repeat a second inventory round in which the second linearly polarized wave is emitted to the second wireless tags.

4. The wireless tag reading apparatus according to claim 3, wherein the controller
   sets, in a case where the number of the first wireless tags is larger than the number of the second wireless tags, the number of times to repeat the first inventory round to be larger than the number of times to repeat the second inventory round, and
   sets, in a case where the number of the second wireless tags is larger than the number of the first wireless tags, the number of times to repeat the second inventory round to be larger than the number of times to repeat the first inventory round.

5. A wireless tag reading apparatus that performs wireless communication with a wireless tag that stores information, the wireless tag reading apparatus comprising:
   an antenna capable of emitting a first linearly polarized wave having a first plane of polarization and a second linearly polarized wave having a second plane of polarization, the second plane of polarization having an orientation that is different from that of the first plane of polarization;
   first and second power feeding ports to which electric power is supplied, the antenna emitting the first linearly polarized wave when the electric power is supplied to the first power feeding port and the second linearly polarized wave when the electric power is supplied to the second power feeding port; and
   a controller configured to
      determine a ratio of a number of first wireless tags that are responsive to the first linearly polarized wave to a number of second wireless tags that are responsive to the second linearly polarized wave, set a ratio of a time of power feeding to the first power feeding port to a time of power feeding to the second power feeding port according to the determined ratio, and switch between the power feeding to the first power feeding port and the power feeding to the second power feeding port in accordance with the set ratio of the power feeding times, and upon receipt of a response wave that is responding to the first linearly polarized wave or the second linearly polarized wave via the antenna, read the information of the wireless tag included in the response wave, wherein the controller is further configured to set:

in a case where the number of the first wireless tags is larger than the number of the second wireless tags, a number of times to repeat a first inventory round in which the first linearly polarized wave is emitted to the first wireless tags to be larger than a number of times to repeat a second inventory round in which the second linearly polarized wave is emitted to the second wireless tags, and in a case where the number of the second wireless tags is larger than the number of the first wireless tags, the number of times to repeat the second inventory round to be larger than the number of times to repeat the first inventory round.

* * * * *